Aug. 6, 1940.  J. H. LONG  2,210,213
OIL FILTER
Filed July 20, 1938
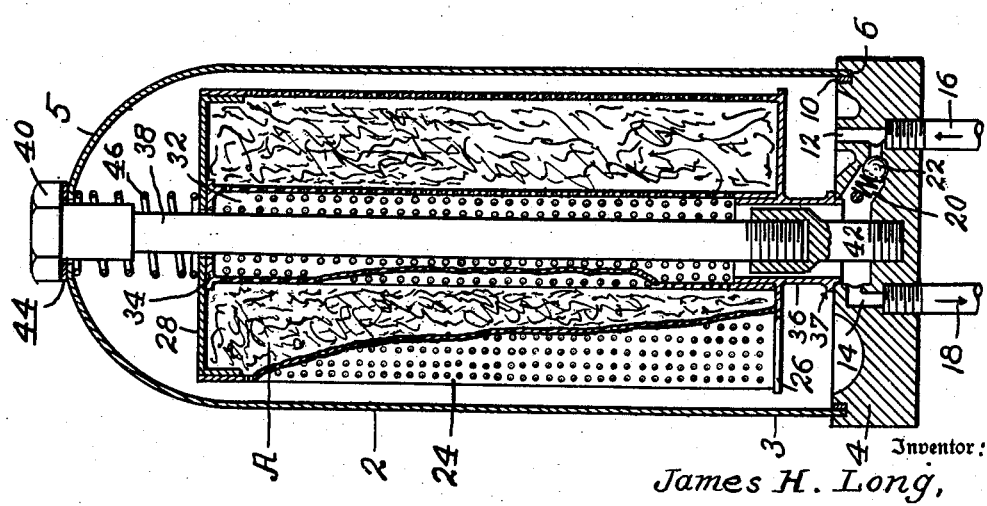
Inventor:
James H. Long,
F. G. Fischer,
Attorney.

Patented Aug. 6, 1940

2,210,213

UNITED STATES PATENT OFFICE 2,210,213

OIL FILTER

James H. Long, Clay Center, Kans.

Application July 20, 1938, Serial No. 220,252

1 Claim. (Cl. 210—131)

My invention relates in general to oil-treating devices and more particularly to oil filters for filtering the oil of internal combustion engines equipped with means for circulating the oil through the associated filters.

The primary object of the invention is the provision of a simple and inexpensive device of this character which can be readily assembled, or taken apart to the end that the inexpensive filtering medium employed can be replaced when desired at a small expenditure of time and labor and without the necessity of discarding any part of the device.

A further object is to arrange the parts in such manner that the oil will not have a long or tortuous path to travel in reaching and passing through the filtering medium, to the end that the oil may pass more frequently through the device and thus be maintained in a cleaner condition.

Another object is to arrange the parts in such manner as to seal off the filtering material from the filtered oil so that there will be no danger of particles of the filtering material getting into and clogging the oil passages.

Other objects will hereinafter appear, and in order that the invention may be fully understood, reference will now be had to the accompanying drawing which shows a vertical sectional view of a filter constructed in accordance with my invention.

Referring in detail to the different parts, 2 designates a casing comprising an outer imperforate cylinder 3 and a base 4 which latter has a large depression in its upper portion into which the heavier impurities in the oil may settle. The cylinder 3 has a closed top 5 and an open bottom, which latter rests in an annular groove 6 in the base 4. The groove 6 is provided with a gasket 10 to form an oil tight joint between the lower end of the cylinder 3 and the base 4, which latter has an inlet 12 and an outlet 14 into which the ends of pipes 16 and 18, respectively, are threaded. The oil is circulated back and forth between the internal combustion engine, not shown, and my filtering device through the pipes 16 and 18 in the usual manner. The inlet 12 communicates with a bypass 20 which leads to the outlet 14 and is controlled by a normally closed check-valve 22.

Arranged axially and removably within the casing 2 is a foraminous filter container 24 which occupies the major portion of the internal space of casing 2 and in which the filtering element or material A is placed. The container 24 is preferably of cylindrical form, closed at its lower end with a fixed bottom 26 and provided at its upper open end with a removable lid 28 so that the filtering material A may be readily placed within or removed from the container 24, which may consist of sheet material perforated uniformly from top to bottom, or wire cloth of suitable mesh. The filtering material A may consist of cotton-waste, felt, wool, or other suitable material.

Arranged concentrically and removably within the container 24 is a foraminous tube 32 into which the filtered oil enters from the container 24. The tube 32 may be made of the same material as the container 24 and is preferably the same length but of less diameter than the interior of the latter. In order to prevent any part of the filtering material A from being forced into the tube 32 with the filtered oil I provide said tube with small perforations through which the filtering material cannot pass and seal the upper and lower ends of the tube against the entrance of any of the material, with a fixed closure 34 and a sleeve 36, respectively.

The sleeve 36 is fixed to the container bottom 26 and telescopes into the open lower end of the tube 32. The sleeve 36 supports the filter container 24 above the base 4 to provide a chamber in which the heavy impurities in the oil may accumulate. The lower part of the sleeve extends downward and communicates with the outlet 14. A peripheral shoulder 37 on the lower portion of the sleeve 36 rests upon the base 4 and limits the entrance of the sleeve into the outlet 14.

The cylinder 2 and the base 4 are held in assembly with an axially disposed tie-rod 38 provided at its upper enlarged end with a head 40 and threaded at its lower end in a fitting 42 which extends downward and is threaded in the base 4. A copper or other suitable gasket 44 is interposed between the top of the cylinder 2 and the head 40 of the tie-rod 38 to provide an oil-tight joint at that point. A coil spring 46, held in place by the tie-rod 38, is interposed between the casing top 5 and the lid 28. The spring 46 presses the lid 28 down against the top 34 of the tube 32, the lower end of which bears upon the container bottom 26. The pressure of the spring 46 holds the shoulder 37 of the sleeve 36 firmly against the top of base 4.

In practice oil is forced into the casing 2 through the inlet 12 and after filling the casing, enters the container 24 through the perforations thereof and passes through the filtering material A which removes the impurities. The filtered oil then enters tube 32 and escapes through sleeve 36 and outlet 14.

The old filtering material can be readily replaced at small expense by fresh material after removal of the tie-rod 38 to permit access to the container 24 and tube 32, the former of which is removable from the casing 2, while the tube 32 is removable from said container, so that all of the perforations may be cleansed preparatory to again assembling the several parts.

From the foregoing description taken in connection with the drawing it is apparent that I have provided an efficient oil filter in which the filtering medium, after becoming permeated with impurities, can be easily and quickly replaced with new filtering material which is less expensive than the sealed filter cartridges used in some types of oil filters and which must be discarded when no longer fit for use.

It is also apparent that my device may be manufactured and maintained at low cost and that the filtering medium is sealed off from the filtered oil, thereby eliminating all possibility of the oil passages becoming clogged with particles of the filtering material.

While I have shown one form of my device it is to be understood that I reserve all rights to such other forms and modifications falling within the spirit and scope of the invention as claimed.

Having thus described my invention, what I claim and desire to secure by Letters Patent, is:

An oil filter for internal combustion engines comprising a base having a depression in its upper portion and provided with an inlet and an outlet, a valve controlled bypass leading from the inlet to the outlet, an outer imperforate cylinder closed at its top and having an open bottom seated in the upper portion of said base, a filter container occupying the major portion of the internal space of said cylinder and uniformly perforated from top to bottom, an imperforate bottom closing the lower end of said container and spaced above the base to provide an intervening chamber, an axially disposed sleeve fixed to said imperforate bottom and extending above and below the latter, the lower end of said sleeve being seated in the base and communicating with the outlet, a foraminous tube of less diameter but approximately the same length as the filter container in which it is concentrically held by the upper portion of said sleeve over which it is removably fitted, a removable lid for the filter container bearing against the upper end of the foraminous tube, a coiled spring interposed between the top of the outer casing and said lid and pressing the latter against the upper end of the foraminous tube and the sleeve against the base, a fitting threaded centrally in the upper portion of the base, and a tie-rod extending axially through the outer casing and threaded at its lower end into said fitting.

JAMES H. LONG.